United States Patent
Krpo et al.

(10) Patent No.: US 11,027,629 B2
(45) Date of Patent: Jun. 8, 2021

(54) SLIDING DEVICE FOR A VEHICLE SEAT PROVIDED WITH AN IMPROVED LOCKING ARRANGEMENT

(71) Applicant: MARTUR ITALY S.R.L., Milan (IT)

(72) Inventors: Azra Krpo, Grugliasco (IT); Can Üstünberk, Grugliasco (IT)

(73) Assignee: MARTUR ITALY S.R.L., Milan (IT)

( * ) Notice: Subject to any disclaimer, the term of this patent is extended or adjusted under 35 U.S.C. 154(b) by 0 days.

(21) Appl. No.: 16/617,542

(22) PCT Filed: Apr. 17, 2019

(86) PCT No.: PCT/IB2019/053187
§ 371 (c)(1),
(2) Date: Nov. 27, 2019

(87) PCT Pub. No.: WO2019/243904
PCT Pub. Date: Dec. 26, 2019

(65) Prior Publication Data
US 2020/0398704 A1 Dec. 24, 2020

(30) Foreign Application Priority Data

Jun. 21, 2018 (IT) .................. 102018000006570

(51) Int. Cl.
*B60N 2/08* (2006.01)
*F16C 1/10* (2006.01)

(52) U.S. Cl.
CPC ......... *B60N 2/0806* (2013.01); *B60N 2/0818* (2013.01); *B60N 2/0875* (2013.01); *F16C 1/10* (2013.01)

(58) Field of Classification Search
CPC .. B60N 2/0806; B60N 2/0818; B60N 2/0875; B60N 2/0825; B60N 2/0862;
(Continued)

(56) References Cited

U.S. PATENT DOCUMENTS

| | | | | |
|---|---|---|---|---|
| 5,816,110 A | * | 10/1998 | Schuler | B60N 2/0705 74/527 |
| 6,637,712 B1 | * | 10/2003 | Lagerweij | B60N 2/0705 248/429 |

(Continued)

FOREIGN PATENT DOCUMENTS

| | | |
|---|---|---|
| EP | 2003013 A2 | 12/2008 |
| FR | 2901193 A1 | 11/2007 |

(Continued)

OTHER PUBLICATIONS

International Search Report and Written Opinion of the International Searching Authority dated Aug. 23, 2019 for International Patent Application No. PCT/IB2019/053187.

*Primary Examiner* — Nkeisha Smith
(74) *Attorney, Agent, or Firm* — Howson & Howson LLP

(57) ABSTRACT

The present invention relates to a sliding device for a vehicle seat provided with an improved locking arrangement. Said locking arrangement comprises a pair of locking assemblies (1a, 1b), one for each track of the sliding device, each including a plurality of locking pins (3a, 3b) suitable for locking the upper rails of the tracks to the respective lower rails. Said locking arrangement further includes a releasing assembly for driving said locking pins to an unlocking configuration for adjusting the position of the vehicle seat. Said releasing assembly comprises a releasing member and a pair of connecting members (7a, 7b), which are in a force transmission connection with the releasing member, on one hand, and with the locking pins (3a, 3b) of a respective locking assembly, on the other hand. According to the invention, such connecting members (7a, 7b) are configured to slide along a substantially linear path and to consequently drive the locking pins along a substantially linear path. Such construction enhances the reliability of the locking arrange- (Continued)

ment and provides for a greater flexibility in designing the locking arrangement itself.

12 Claims, 4 Drawing Sheets

(58) Field of Classification Search
CPC ...... B60N 2/0868; B60N 2/07; B60N 2/0715; F16C 1/10
USPC .......... 248/428, 429, 430, 424, 425
See application file for complete search history.

(56) References Cited

U.S. PATENT DOCUMENTS

| | | | | |
|---|---|---|---|---|
| 6,669,284 B2* | 12/2003 | Feichtinger | .......... | B60N 2/0705 248/429 |
| 6,764,054 B2* | 7/2004 | Becker | .......... | B60N 2/0707 248/424 |
| 7,600,816 B2* | 10/2009 | Bauersachs | .......... | B60N 2/0806 248/429 |
| 7,980,525 B2* | 7/2011 | Kostin | .......... | B60N 2/0881 248/429 |
| 8,029,063 B2* | 10/2011 | Kazyak | .......... | B60N 2/0806 297/344.1 |
| 8,708,300 B2 | 4/2014 | Fujishiro et al. | | |
| 8,955,813 B2* | 2/2015 | Beneker | .......... | B60N 2/0806 248/429 |
| 9,033,299 B2* | 5/2015 | Kramm | .......... | B60N 2/0705 248/429 |
| 9,050,908 B2* | 6/2015 | Speck | .......... | B60N 2/08 |
| 9,205,763 B2* | 12/2015 | Anticuar | .......... | B60N 2/0806 |
| 9,272,639 B2* | 3/2016 | Lee | .......... | B60N 2/0875 |
| 9,481,266 B2* | 11/2016 | Kim | .......... | B60N 2/0806 |
| 9,597,981 B2* | 3/2017 | Kim | .......... | B60N 2/0806 |
| 10,266,074 B2* | 4/2019 | Anticuar | .......... | B60N 2/0705 |
| 10,363,839 B2* | 7/2019 | Fukuda | .......... | B60N 2/08 |
| 2003/0006355 A1 | 1/2003 | Horsfield | | |
| 2004/0026975 A1* | 2/2004 | Rausch | .......... | B60N 2/0875 297/344.1 |
| 2004/0164600 A1* | 8/2004 | Rausch | .......... | B60N 2/123 297/344.1 |
| 2008/0308704 A1 | 12/2008 | Kostin | | |
| 2011/0240820 A1* | 10/2011 | Napau | .......... | B60N 2/0705 248/429 |
| 2014/0263920 A1* | 9/2014 | Anticuar | .......... | B60N 2/0715 248/429 |
| 2016/0039314 A1* | 2/2016 | Anticuar | .......... | B60N 2/0715 248/429 |
| 2016/0046208 A1 | 2/2016 | Anticuar et al. | | |
| 2018/0229625 A1* | 8/2018 | Gorcic | .......... | B60N 2/0727 |
| 2020/0391619 A1 | 12/2020 | Krpo et al. | | |
| 2020/0391620 A1 | 12/2020 | Krpo et al. | | |
| 2020/0406785 A1 | 12/2020 | Krpo et al. | | |
| 2021/0046851 A1 | 2/2021 | Spagnoli et al. | | |
| 2021/0053469 A1 | 2/2021 | Spagnoli et al. | | |

FOREIGN PATENT DOCUMENTS

| | | |
|---|---|---|
| JP | 2001-180341 A | 7/2001 |
| JP | 2016-147639 A | 8/2016 |
| KR | 100789640 B1 | 12/2007 |
| KR | 101200123 B1 | 11/2012 |
| TW | M506740 U | 8/2015 |

* cited by examiner

SLIDING DEVICE FOR A VEHICLE SEAT PROVIDED WITH AN IMPROVED LOCKING ARRANGEMENT

TECHNICAL FIELD

The present invention relates to a sliding device for a vehicle seat provided with an improved locking arrangement.

More particularly, the present invention relates to a sliding device for a vehicle seat provided with a locking arrangement providing an improved reliability and a greater flexibility in designing the locking arrangement itself.

BACKGROUND ART

Vehicle seats generally have a sliding function for pushing or pulling the seat cushion in a forward or backward direction, a height adjustment function for adjusting the height of the seat cushion, and a reclining function for adjusting the inclination of the seat backrest relative to the seat cushion.

The aforesaid sliding function is generally implemented by a sliding device which comprises a pair of parallel tracks, each of which comprises a lower rail attached to the vehicle floor and an upper rail attached to the vehicle seat, the upper rail being constrained to the lower rail, but being able to slide relative to said lower rail.

The sliding device further comprises a locking arrangement for allowing/preventing a movement of the upper rails relative to the lower rails. Such locking arrangement is normally in a locking configuration, in which it prevents the upper rails from sliding with respect to the lower rails, thus avoiding accidental displacements of the seat with respect to the vehicle floor.

Such locking arrangement normally comprises a pair of locking assemblies, one for each track.

The sliding device is further provided with a releasing member which can be used by a user for moving the locking assemblies of the locking arrangement to an unlocking configuration, in which the upper rails are free to move relative to the lower rails, so that the position of the seat with respect to the vehicle floor can be adjusted.

Sliding devices are known from the art in which, in order to provide a positive engagement between the upper and lower rails, the lower rail of each track is provided with a series of apertures, aligned and preferably equally spaced from one another along the longitudinal axis of said lower rail, and each locking assembly is connected to the respective upper rail and comprises one or more locking pins configured to penetrate into respective apertures of the lower rail and engage with the edge of said apertures.

Preferably, several locking pins are provided and the size of said locking pins, the distance between said locking pins, the size of the apertures in the lower rails and the distance between said apertures are chosen so that at least one locking pin is always aligned with a corresponding aperture, so that it can penetrate into said aperture and engage the edge thereof.

Most preferably, the size of said locking pins, the distance between said locking pins, the size of the apertures in the lower rails and the distance between said apertures are chosen so that at least a first locking pin is positioned so as to penetrate into a corresponding aperture and engage the forward side of the edge thereof and at least a second locking pin is positioned so as to penetrate into a corresponding window and engage the rearward side of the edge thereof, whereby a "chuckless" engagement is obtained.

Such locking pins are normally biased, e.g. by means of springs, to a locking configuration, in which at least some of them engage respective apertures of the lower rails.

In order to move the locking assemblies to their unlocking configuration for adjusting the position of the vehicle seat with respect to the vehicle floor, a releasing member is provided, which acts upon respective connecting members, one for each locking assembly: said connecting members, in turn, act upon the locking pins of the respective locking assembly for moving them to an unlocking configuration, in which they are disengaged from the apertures of the respective lower rail.

To this purpose, the locking pins are generally provided with an enlarged head and the connecting members are provided with fork-shaped elements adapted to engage the pin heads for extracting said pins from the apertures of the lower rails.

Such locking arrangements for a sliding device for vehicle seats are disclosed, for instance, in documents US 2003/006355, U.S. Pat. Nos. 7,980,525 and 6,637,712.

However, a locking arrangement of the kind disclosed in the aforesaid documents is not free from drawbacks.

More particularly, in the known locking arrangements the releasing member is designed for making the connecting members rotate about a pivoting axis in order to move the locking pins from the locking configuration to the unlocking configuration: upon rotation of the connecting members, the fork-shaped elements of said connecting members move upwardly along an arc-shaped path, thus engaging the heads of the locking pins and lifting said locking pins so as to disengage them from the apertures of the corresponding lower rail.

As the fork-shaped elements of the connecting members move along an arc-shaped path, the locking pins will move along an arc-shaped path as well, which can entail remarkable problems.

First of all, during their movement the locking pins may get stuck against the edge of the respective apertures of the lower rails, thus causing jamming of the respective locking assembly.

Secondly, due to the movement along an arc-shaped path, the length of the stroke of the locking pins is limited, which allows little margin for guaranteeing that the locking pins correctly move out of the apertures of the lower rails when actuated by the connecting members of the release assembly.

Thirdly, when designing the locking arrangement, enough room has to be provided for the rotational movement of the connecting members and of the locking pins.

These problems are worsened by the fact that the fork-shaped elements of the connecting members engage the locking pins at their heads, i.e. at the opposite end with respect to the tip penetrating into the apertures of the lower rails.

Furthermore, in the locking arrangements of the kind disclosed in the abovementioned documents, the releasing member is made as a "U"-shaped handle or towel bar having two substantially parallel arms, the end portions of which are configured to simultaneously act upon respective connecting members for rotating them.

Accordingly, when designing the locking arrangement, enough room has also to be provided for the releasing handle and its connection to the connecting members.

Therefore, a main object of the present invention is to provide a sliding device for a vehicle seat provided with an improved locking arrangement allowing to avoid the risk of jamming and guaranteeing a correct disengagement of the locking pins from the apertures of the lower rails.

A further object of the present invention is to provide a sliding device for a vehicle seat provided with an improved locking arrangement having little encumbrance and thus allowing for an increased flexibility in designing the locking arrangement itself.

These and other objects are achieved by a sliding device as claimed in the appended claims.

SUMMARY OF INVENTION

The invention relates to sliding device for a vehicle seat which comprises a pair of parallel tracks, each including a lower rail, intended to be attached to the vehicle floor, and an upper rail, intended to be attached to the vehicle seat and slidably mounted to said lower rail, each lower rail comprising a plurality of apertures, aligned and equally spaced from one another along the longitudinal axis of said lower rail.

The sliding device further comprises a locking arrangement which comprises a locking assembly associated to each track for selectively allowing/preventing a movement of said upper rails relative to said lower rails. Each locking assembly is connected to a respective upper rail and comprises one or more locking pins configured to penetrate into corresponding apertures of the respective lower rail and to engage the edges of said apertures, said locking pins being biased to a locking configuration, for instance by spring means.

According to a preferred embodiment of the invention, each locking assembly comprises a plurality of locking pins. According to a particularly preferred embodiment of the invention, such locking pins are sized and arranged so that, for any position of the upper rail relative to the lower rail, at least one locking pin is aligned with a corresponding aperture of the respective lower rail and can penetrate into said aperture and engage the edge thereof.

The locking arrangement is further provided with a releasing assembly for simultaneously switching said locking assemblies from a locking configuration, in which the movement of the upper rails of the tracks relative to the respective lower rails is prevented, to an unlocking configuration, in which the movement of said upper rails relative to the respective lower rails is allowed.

Said releasing assembly comprises a releasing member and a pair of connecting members, one for each locking assembly, each of said connecting members being in a force transmission connection with the releasing member, on one hand, and with the locking pins of the respective locking assembly, on the other hand.

Accordingly, when a user applies a force to the releasing member, such force is transmitted from the releasing member to the connecting members, and from said connecting members to the locking pins of the respective locking assembly, thus driving said locking pins from their locking configuration to their unlocking configuration.

According to the invention, when actuated by the releasing member, such connecting members slide along a substantially linear path and accordingly drive the locking pins along a substantially linear path for moving said locking pins form their locking configuration to their unlocking configuration.

Analogously, such connecting members slide along a substantially linear path and accordingly drive the locking pins along a substantially linear path when said locking pins are brought back to their locking configuration.

Thanks to the substantially translational movement of the connecting members and locking pins, the risk that the locking pins get stuck against the edge of the apertures of the lower rails is avoided, thus avoiding the risk of jamming of the locking assemblies.

Moreover, the length of the stroke of the locking pins can be increased with respect to traditional locking arrangements, thus ensuring a correct disengagement of the locking pins from the apertures of the lower rails.

In addition, as the connecting members and the locking pins move along a substantially vertical direction, the overall room that is to be provided when designing the locking arrangement is reduced with respect to traditional locking arrangements.

Moreover, as both the connecting members and the locking pins move along a substantially linear path, the kinematic connections between the releasing member and the locking pins can be simplified and the number of kinematic joints (and therefore the kinematic losses) can be reduced.

Furthermore, the aforesaid construction of the connecting members allows to arrange the releasing member remotely from the locking assemblies, which strongly enhances the flexibility in designing the locking arrangement of the sliding device according to the invention.

According to a preferred embodiment of the invention, each locking assembly comprises one or more locking pins which are provided with at least one transversely projecting peg, preferably with two diametrically opposed transversely projecting pegs.

Each connecting member correspondingly comprises an engaging plate provided with a window having a width larger than the diameter of the locking pins but smaller than the sum of the diameter of the locking pins and of the length of the projecting pegs, and the transversely projecting pegs are arranged on the respective locking pins so that they are substantially in abutment against such engaging plate when the locking pins are completely inserted into the apertures of the lower rails.

Thanks to this construction, the edge of the window of the engaging plate can engage such pegs for lifting the locking pins and driving them to their unlocking configuration.

According to a preferred embodiment of the invention, each connecting member further comprises a lifting plate, which is substantially parallel to the engaging plate and is rigidly connected to said engaging plate by means of connecting studs provided at opposite ends of said plates.

The structure formed by the engaging plate, the lifting plate and the connecting studs confers a high stiffness to the connecting member and ensures that the locking pins are correctly moved along a substantially linear path together with the engaging plate of the connecting member.

In addition, such rigid structure, and in particular the connecting studs, can absorb part of inertial loads in case of impacts, thus protecting the locking assemblies.

According to a preferred embodiment of the invention, each connecting members further comprises a wire or cable, such a Bowden cable, for the connection to the releasing member.

This advantageously allows to arrange the releasing member remotely from the connecting members and the locking assemblies, which provides for an enhanced flexibility in designing the locking arrangement.

BRIEF DESCRIPTION OF DRAWINGS

Further features and advantages of the invention will become more evident from the detailed description of a preferred embodiment thereof, given by way of non-limiting example, with reference to the attached drawing, in which.

DESCRIPTION OF EMBODIMENTS

Figure 1:
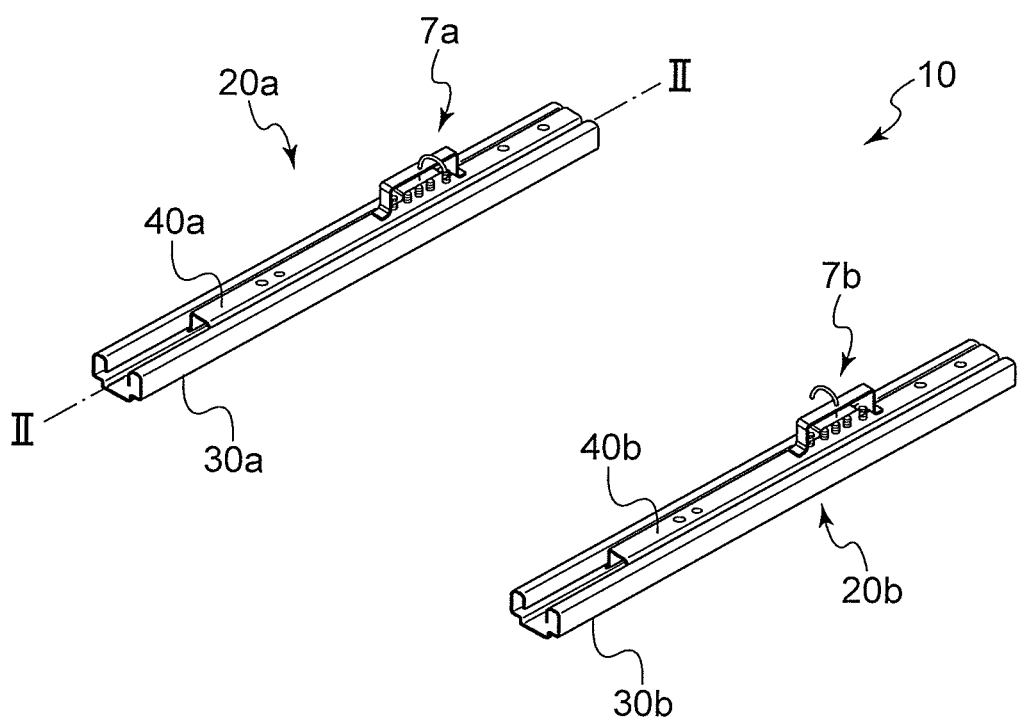
FIG. 1 is a perspective view of a sliding device according to the invention.

With reference to FIG. 1, a sliding device 10 according to the invention is shown.

In a per se known manner, the sliding device 10 comprises a pair of parallel tracks 20a, 20b, each comprising a lower rail 30a, 30b, intended to be attached to the vehicle floor, and an upper rail 40a, 40b, intended to be attached to the frame of a vehicle seat.

Each upper rail 40a, 40b is constrained to the respective lower rail 30a, 30b, but can slide relative to said lower rail.

In order to selectively allow/prevent a sliding movement of the upper rails relative to the lower rails of the tracks 20a, 20b, a locking arrangement is provided. Said locking arrangement comprises two locking assemblies, one for each track 20a, 20b.

Figure 2:
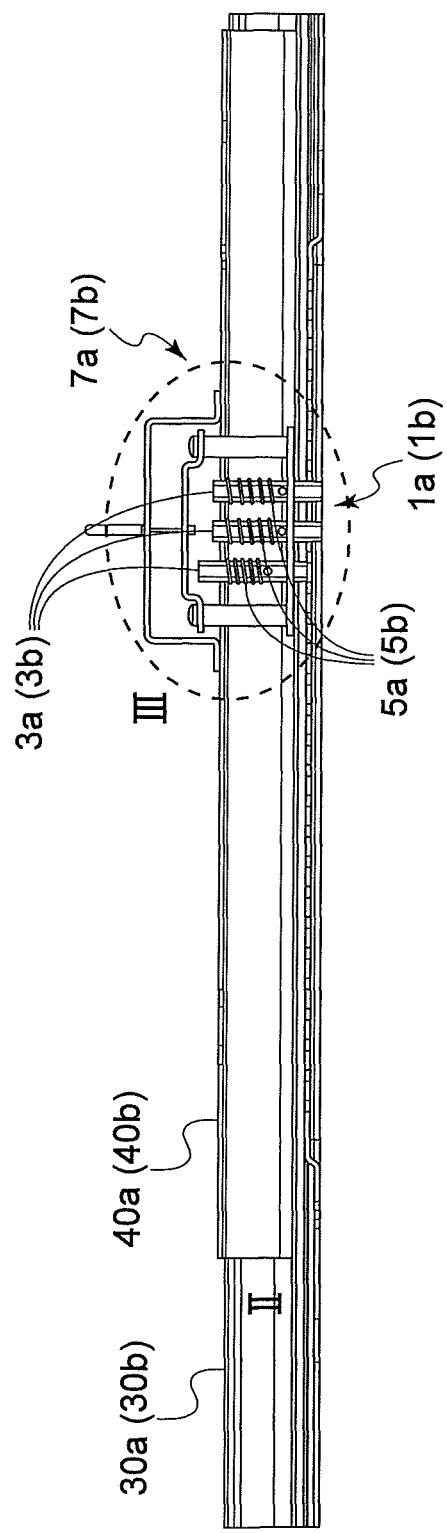
FIG. 2 is a cross-sectional view of the sliding device of FIG. 1 taken along the line II-II.
Figure 3:
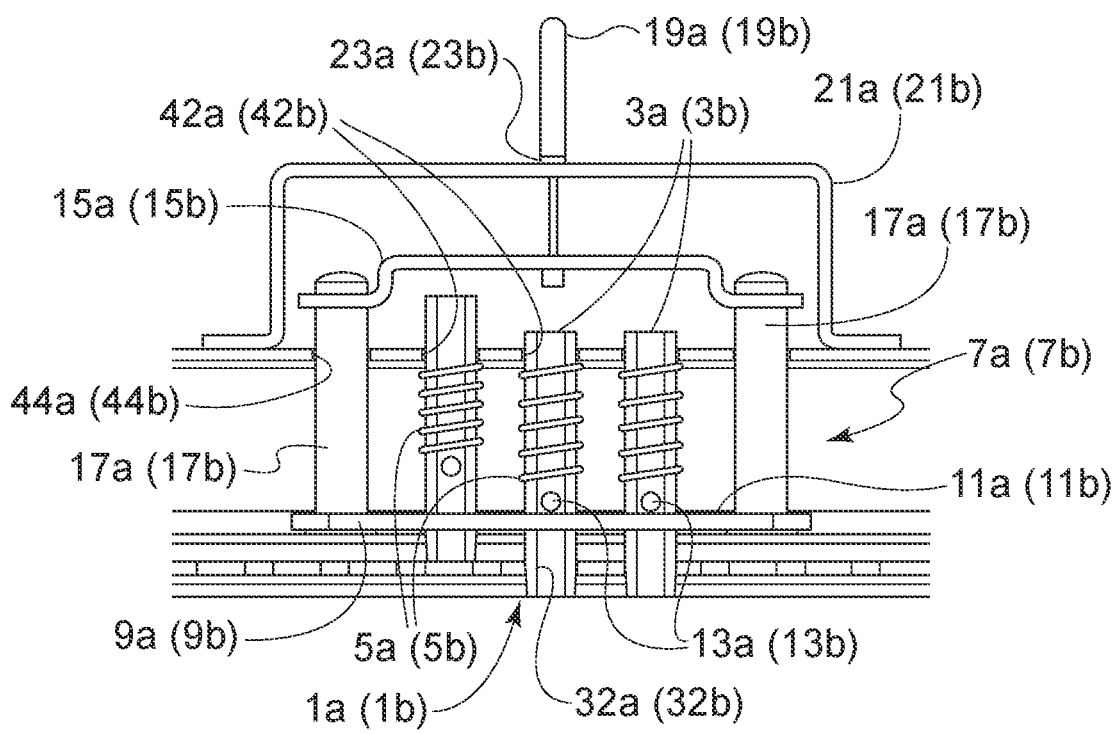
FIG. 3 is an enlarged view of the detail III of FIG. 2, in a first, locking configuration.
Figure 4:
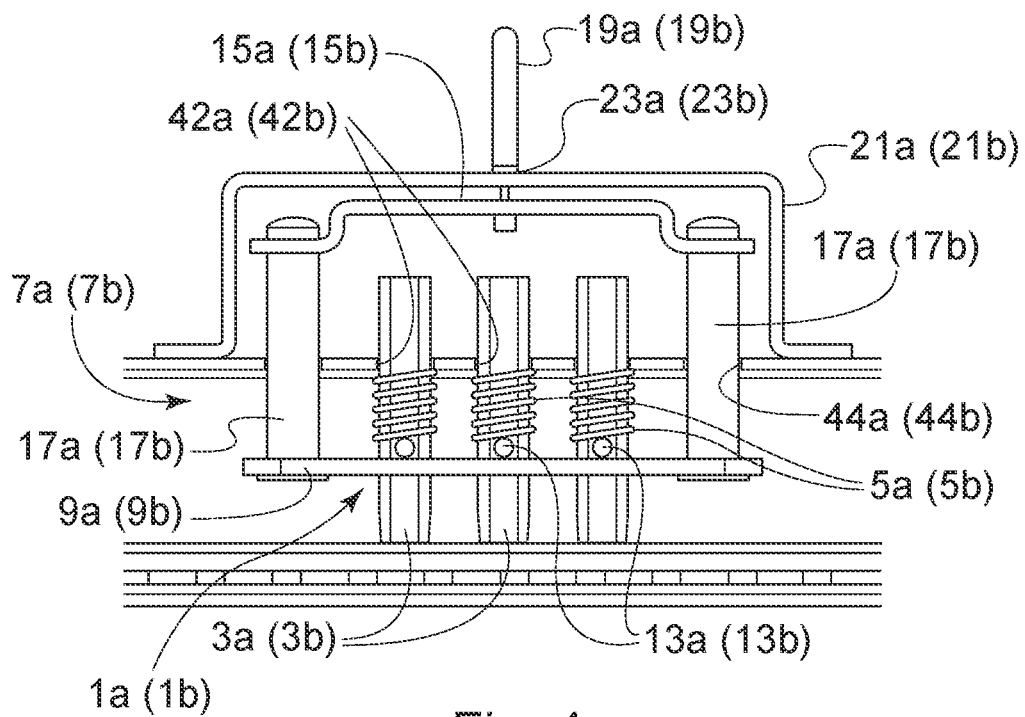
FIG. 4 is an enlarged view of the detail III of FIG. 2, in a second, unlocking configuration.

One of said locking assemblies is shown in FIGS. 2-4. It is to be intended that the other locking assembly is identical to the one shown in FIGS. 2-4.

Each locking assembly 1a, 1b comprises one or more locking pins 3a, 3b (three in the shown embodiment), which are configured to pass through apertures 42a, 42b provided in the respective upper rail 40a, 40b and penetrate into apertures provided in the respective lower rail 30a, 30b for locking the upper rails to the lower rails and preventing any movements of said upper rails relative to said lower rails.

As will be disclosed in greater detail below, the locking pins 3a, 3b are arranged so that, at any position of the upper rails relative to the lower rails, at least one of them—and preferably two of them—is aligned with a corresponding aperture of the respective lower rail and penetrates therethrough.

The locking pins 3a, 3b have a substantially cylindrical body ending with a conical or frustoconical tip for facilitating their insertion into said apertures of the lower rails.

The locking pins 3a, 3b are biased to their locking configuration, in which at least some of them penetrate into corresponding apertures of the respective lower rail.

To this purpose, a helical spring 5a, 5b is wound around the body of each locking pin 3a, 3b and the upper ends of the helical springs 5a, 5b abut against the edge of corresponding apertures 42a, 42b of the upper rails, thus biasing such locking pins downwards, towards the apertures 32a, 32b of the lower rails.

In order to allow a user to adjust the position of the seat relative to the vehicle floor, the locking arrangement of the sliding device according to the invention also comprises a releasing assembly for moving the locking pins 3a, 3b from the aforesaid locking configuration to an unlocking configuration, in which all the locking pins are extracted from the apertures of the respective lower rail, thus allowing the upper rails to slide relative to the lower rails.

In general, the releasing assembly comprises a releasing member (not shown) and a pair of connecting members 7a, 7b, one for each locking assembly 1a, 1b, each connecting member being in a force transmission connection with the releasing member, on one hand, and with the locking pins 3a, 3b of the respective locking assembly, on the other hand.

According to the invention, the connecting members 7a, 7b are configured to slide along a substantially linear path and to accordingly drive the locking pins 3a, 3b along a substantially linear path for moving such locking pins from their locking configuration to their unlocking configuration.

To this purpose, in the shown embodiment each connecting member 7a, 7b comprises an engaging plate 9a, 9b arranged between the respective upper and lower rails and provided with a window 11a, 11b, through which the locking pins 3a, 3b are configured to pass.

In order to allow the locking pins 3a, 3b to be driven by the engaging plate 9a, 9b, such locking pins are provided with transversely projecting pegs 13a, 13b. Preferably, each locking pin 3a, 3b is provided with two diametrically opposed transversely projecting pegs 13a, 13b.

Said transversely projecting pegs 13a, 13b are arranged on the body of the locking pins 3a, 3b so that they are substantially in abutment against the engaging plate 9a, 9b when said locking pins are completely inserted into the apertures 32a, 32b of the lower rails 30a, 30b (locking configuration).

Correspondingly, the window 11a, 11b of the engaging plate is designed so that its width is larger than the diameter of the locking pins 3a, 3b, but smaller than the sum of the diameter of said locking pins and of the length of the transversely projecting pegs 13a, 13b, so that the edge of this window can engage the transversely projecting pegs 13a, 13b and lift the locking pins 3a, 3b until they become disengaged from the apertures 32a, 32b of the lower rails 30a, 30b.

It is to be noted that in the shown embodiment, the engaging plates 9a, 9b of the connecting members both support the locking pins 3a, 3b in their locking configuration and drive said locking pins to their unlocking configuration, thus avoiding the need of separate support elements for said locking pins.

In order to confer high stiffness to the connecting members 7a, 7b, each connecting member further comprises a second plate, i.e. a lifting plate 15a, 15b, which is arranged outside the respective track, above the respective upper rail, is substantially parallel to the engaging plate 9a, 9b and is connected to said engaging plate by means of connecting studs 17a, 17b passing through through-holes 44a, 44b provided in the upper rails 40a, 40b.

Thanks to the rigid structure formed by the engaging plate 9a, 9b, the lifting plate 15a, 15b and the connecting studs 17a, 17b, it can be guaranteed that the locking pins can be properly driven along a substantially rectilinear path.

Each connecting member 7a, 7b further includes a connecting element 19a, 19b for connection to the releasing member.

In the shown preferred embodiment, such connecting element is made as a wire or cable 19a, 19b, such as a Bowden cable, connecting the lifting plate 15a, 15b to the releasing member.

In alternative embodiments, in which the lifting plate is not provided, the connecting cable 19a, 19b could also be directly connected to the engaging plate.

The provision of a cable as a connecting element advantageously allows to arrange the releasing member remotely from the locking assemblies 1a, 1b, thus providing a high flexibility in designing the locking arrangement of the sliding device according to the invention.

However, any other mechanical connection or linkage between the releasing member and the connecting members could also be envisaged.

As can be seen in the Figures, in order to further enhance the stiffness of the connecting members 7a, 7b, a bracket 21a, 21b is fixedly fastened to the upper rail 40a, 40b of each track of the sliding device, and the cable 19a, 19b connected to the lifting plate 15a, 15b passes through an opening 23a, 23b provided in said fixed bracket 21a, 21b.

Such fixed bracket 21a, 21b can be fastened to the respective upper rail by any conventional technique, such as welding. However, according to a preferred embodiment, the bracket 21a, 21b is fastened to the respective upper rail by cold working, for instance by riveting. This prevents the risk of distortion of the rails induced by heat during welding operation or analogous hot working and represents a remarkable advantage, since such distortion of the rails may entail high sliding efforts and noise issues.

The operation of the locking arrangement of the sliding device according to the invention can be summarized as follows.

With particular reference to FIG. 3, in a rest condition, the springs 5a, 5b bias the locking pins 3a, 3b of the locking assemblies 1a, 1b towards the apertures 32a, 32b of the lower rails 30a, 30b and at least some of said locking pins penetrate into corresponding apertures of the respective lower rail. In such locking configuration, the upper rails 40a, 40b cannot slide relative to the lower rails 30a, 30b.

When a user wishes to adjust the position of the vehicle seat relative to the vehicle floor, he/she applies a force to the releasing member, thus pulling the cables 19a, 19b of the connecting members 7a, 7b.

As a result, as shown in FIG. 4, the lifting plates 15a, 15b and, consequently, the engaging plates 9a, 9b of the connecting members 7a, 7b are pulled upwards (see arrows F in FIG. 4).

As the engaging plates 9a, 9b move upwards, the edges of the windows 11a, 11b engage the transversely projecting pegs 13a, 13b of the locking pins 3a, 3b and, by overcoming the elastic resistance of the springs 5a, 5b, push said locking pins 3a, 3b, which move upwards along a substantially linear path (guided by the apertures 42a, 42b of the respective upper rail) until they become disengaged from the apertures 32a, 32b of the respective lower rail 30a, 30b.

In such an unlocking configuration, the upper rails 40a, 40b can slide relative to the lower rails 30a, 30b and the position of the vehicle seat can be adjusted.

When the user releases the releasing handle, the springs 5a, 5b bias the locking pins 3a, 3b back towards the respective lower rail 30a, 30b, and at least some of said locking pins penetrate into corresponding apertures of said lower rail, thus blocking the upper rail relative to the lower rail in a new, desired position.

Figure 5A:
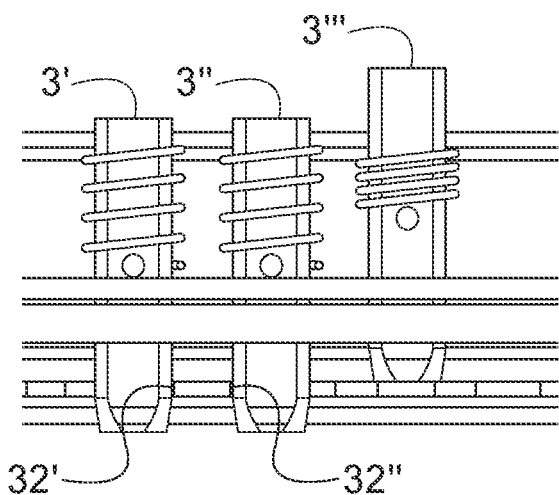
FIG. 5a shows a first locking configurations of the locking pins of the locking assembly of FIG. 2.
Figure 5B:
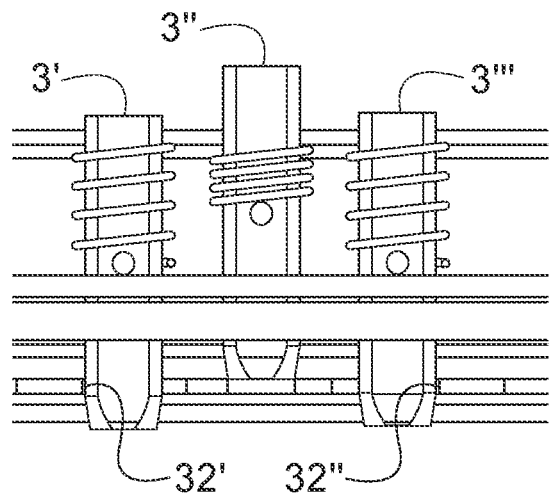
FIG. 5b shows a second locking configurations of the locking pins of the locking assembly of FIG. 2.
Figure 5C:
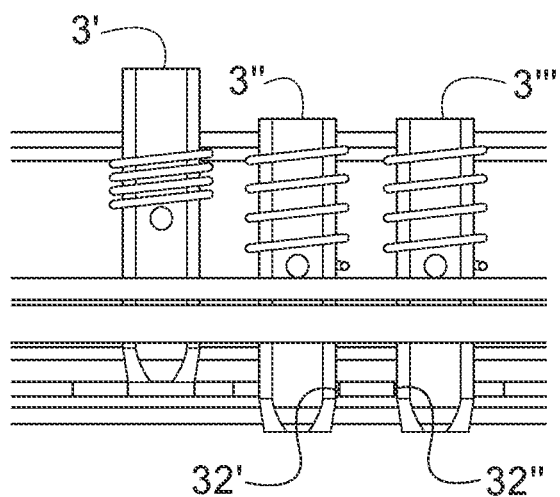
FIG. 5c shows a third locking configurations of the locking pins of the locking assembly of FIG. 2.

Referring now to FIGS. 5a-5c, possible locking configurations of the locking pins 3a, 3b are schematically shown.

The size of said locking pins 3a, 3b, the distance between said locking pins, the size of the apertures 32a, 32b in the lower rails and the distance between said apertures can be chosen so as to obtain a "chuckless" engagement.

In a first possible configuration, shown in FIG. 5a, the middle pin 3" penetrates into an aperture 32" of the lower rail and engages the front side of its edge (primary locking), while the front pin 3' penetrates into a further aperture 32' of the lower rail, immediately preceding the aperture 32", and engages the rear side of its edge (secondary locking); the rear pin 3''' does not penetrate into any aperture of the lower rail and abuts against the web between two adjacent apertures (namely, the aperture 32" and the following one).

In a second possible configuration, shown in FIG. 5b, the front pin 3' penetrates into an aperture 32' of the lower rail and engages the front side of its edge (primary locking), while the rear pin 3''' penetrates into a further aperture 32" of the lower rail, immediately following the aperture 32', and engages the rear side of its edge (secondary locking); the middle pin 3" does not penetrate into any aperture of the lower rail and abuts against the web between two adjacent apertures (namely, the apertures 32', 32").

In a third possible configuration, shown in FIG. 5c, the rear pin 3''' penetrates into an aperture 32" of the lower rail and engages the front side of its edge (primary locking), while the middle pin 3" penetrates into a further aperture 32' of the lower rail, immediately preceding the aperture 32", and engages the rear side of its edge (secondary locking); the front pin 3' does not penetrate into any aperture of the lower rail and abuts against the web between two adjacent apertures (namely, the aperture 32' and the preceding one).

The above description of a preferred embodiment of the invention has been given merely by way of example and several variants and modifications within the reach of the person skilled in the art can be envisaged, without departing from the scope of the invention as defined by the appended claims.

The invention claimed is:

1. A sliding device for a vehicle seat, comprising:
a pair of parallel tracks, each comprising a lower rail and an upper rail, each of the upper rail being constrained to a respective lower rail, but slidable relative to the lower rail,
wherein the upper rails and the lower ails have respective longitudinal axes,
wherein the lower rails are provided with a plurality of apertures arranged along the longitudinal axes of the lower rails,
wherein the sliding device is provided with a locking arrangement including two locking assemblies, one for each of the tracks,
wherein each locking assembly comprises one or more locking pins, which are configured to penetrate into corresponding apertures of the respective lower rail,
wherein the locking arrangement further comprises a releasing assembly for moving the locking pins from a locking configuration to an unlocking configuration,
wherein the releasing assembly comprises a releasing member and a pair of connecting members, one for each locking assembly, each connecting member being in a force transmission connection with the releasing member and with the locking pins of the respective locking assembly, such that, when a force is applied to the releasing member, the force is transmitted from the releasing member to the connecting members, and from the connecting members to the locking pins of the respective locking assembly,. thereby driving the locking pins from their locking configuration to their unlocking configuration,
wherein the connecting members are configured to drive the locking pins along a substantially linear path from the locking configuration to the unlocking configuration, wherein each connecting member comprises an engaging plate, arranged between the respective upper and lower rails and provided with a window, through which the locking pins are configured to pass, wherein each engaging plate is configured to slide along a substantially linear path to drive the locking pins of the respective locking assembly along a substantially linear path from the locking configuration to the unlocking configuration, wherein each of the locking pins is provided with at least one transversely projecting peg, wherein the width of the window is larger than the diameter of the locking pins, but smaller than the sum of the diameter of the locking pins and of the length of the at least one transversely projecting peg, and wherein each of the at least one transversely projecting peg is arranged on a body of one of the locking pins so that the at least one transversely projecting peg is substantially in abutment against the respective engaging plate when the locking pin on which the at least one transversely peg is arranged is completely inserted into one of the apertures of the lower rails.

2. The sliding device according to claim 1, wherein each of the locking pins is provided with two diametrically opposed transversely projecting pegs.

3. The sliding device according to claim 1, wherein each of the connecting members further comprises a lifting plate, which is arranged above the respective upper rail, is substantially parallel to the engaging plate and is connected to the engaging plate by means of connecting studs passing through through-holes provided in the upper rails.

4. The sliding device according to claim 3, wherein each of the connecting members further comprises a connecting element for connecting the :lifting plate to the releasing member.

5. The sliding device according to claim 4, wherein the connecting element is made as a wire or cable.

6. The sliding device according to claim 5, wherein each of the connecting members further comprises a bracket fixedly fastened to the respective upper rail and wherein the wire or cable passes through an opening provided in the bracket.

7. The sliding device according to claim 4, wherein the connecting element is a Bowden cable.

8. The sliding device according to claim 1, wherein each of the connecting members further comprises a connecting element for connecting the engaging plate to the releasing member.

9. The sliding device according to claim 8, wherein the connecting element is made as a wire or cable.

10. The sliding device according to claim 9, wherein each of the connecting members further comprises a bracket fixedly fastened to the respective upper rail and wherein the wire or cable passes through an opening provided in the bracket.

11. The sliding device according to claim 8, wherein the connecting element is a Bowden cable.

12. The sliding device according to claim 1, wherein the locking pins are biased towards the apertures of the lower rails by springs.

* * * * *